March 18, 1952
G. SABOL, JR., ET AL
2,589,437
ILLUMINATING DEVICE FOR MOTION-PICTURE
PROJECTING OR VIEWING APPARATUS
Filed July 6, 1948
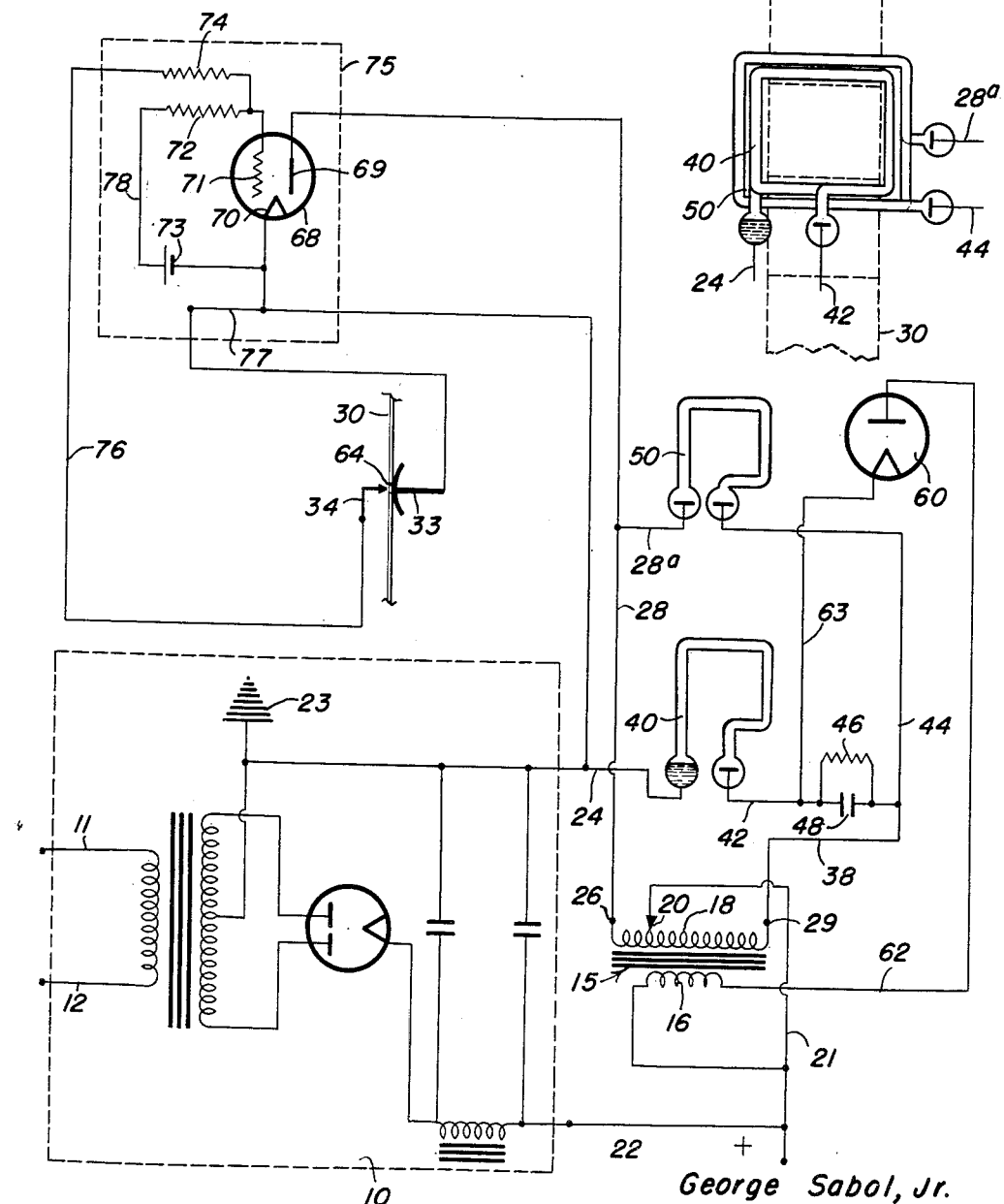
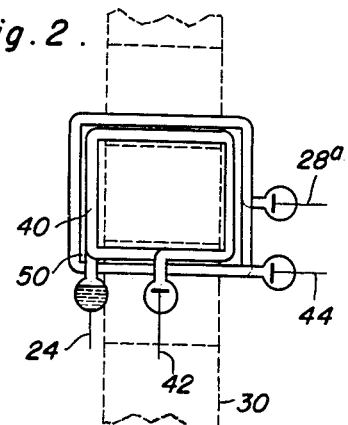
George Sabol, Jr.
Michael Sabol
INVENTORS
BY *Clarence A. O'Brien*
*and Harvey B. Jacobson*
Attorneys Patented Mar. 18, 1952

2,589,437

UNITED STATES PATENT OFFICE 2,589,437

ILLUMINATING DEVICE FOR MOTION-PICTURE PROJECTING OR VIEWING APPARATUS

George Sabol, Jr., and Michael Sabol, Clairton, Pa.

Application July 6, 1948, Serial No. 37,106

3 Claims. (Cl. 315—232)

This invention relates to the production of motion pictures with or without sound tracks arranged on both sides of an opaque film, band, strip or ribbon which are illuminated at predetermined intervals during their passage through a viewing or projection opening or window. A system of this type has been described in U. S. Patents Nos. 2,173,768 and 2,262,051 granted to the present applicants and to John Sabol. It is the object of the present invention to improve the intermittent illumination of the pictures which takes the place or performs the function of the intermittent projection of the pictures in the customary projectors.

In said earlier patents an electric vapor lamp of the mercury arc type shaped in the form of a helix surrounded one picture, the space surrounded by said discharge tube or lamp forming the viewing or projection window. Said mercury filled discharge tube was illuminated intermittently by current pulsations the frequency of which was governed by the passage of the pictures through the viewing or projection window.

It has been found that the viewing of motion pictures in reflected light is particularly effective if the pictures are made in colors and especially in natural colors, but the showing of colored pictures is greatly affected by the necessity to use an electric discharge tube as a source of illumination. A mercury filled discharge tube emits rays which belong predominantly to the short wave end of the spectrum and therefore the colors are not reproduced in a perfect manner.

It is therefore an object of the present invention to provide illuminating means which are capable of being operated by current impulses in the manner above set forth, but which emit rays which belong to several sections of the spectrum.

It is a further object of the invention to provide illuminating means which consists of a plurality of discharge tubes, capable of being operated at predetermined intervals by current impulses, which encircle the picture completely and which consist of a mercury filled discharge tube and of a neon filled discharge tube operating conjointly.

It is a further object of the invention to provide means controlled by the movement of the picture carrying ribbon, strip or film which produce current impulses of such frequency that the said discharge tubes may be operated at the rate of change of the pictures on the ribbon passing behind said illuminating device.

It is a further object of the invention to provide means, controlled by the advance of the picture carrying ribbon, producing current impulses synchronized with the passage of a picture behind the discharge tubes providing the illumination which are capable of generating, through transformation or otherwise, high voltage impulses supplying the said mercury filled discharge tube and neon filled discharge tube simultaneously with operative currents.

It is a further object of the invention to provide voltage transforming means operated by current impulses which are controlled by the advance of the ribbon which transformer means are capable of generating high voltage currents with which the illuminating means, consisting of a mercury filled discharge tube and of a neon filled discharge tube, are supplied, said high voltage currents being supplemented by voltage boosting means operated by the lower resistance of the mercury filled tube after the initiation of a discharge, the said currents furnishing the high voltage current necessary for operating the neon tube.

Further objects of a more specific character will be stated in the detailed specification.

The invention is illustrated in the accompanying drawing showing one embodiment of the same by way of example. It is however to be understood that the example shown is not limitative, but is provided for the purpose of explaining the principle of the invention and one of the modes of applying said principle. Sufficient information is supplied to the expert skilled in the art in the following specification to enable the expert to apply the principle of the invention in a modified manner. Modifications of the example shown are therefore not necessarily departures from the essence of the invention.

In the drawings:

Figure 1 is a diagram of the connection.

Figure 2 is another diagram illustrating how the illuminating discharge tubes are placed with respect to the picture carrying ribbon.

In the following specification the reference numerals designating parts mentioned in the two earlier Patents Nos. 2,173,768 and 2,262,051 are identical with those used in the said patents. As explained in the aforesaid earlier patents the present invention is relative to a motion picture device in which the film, band or ribbon of opaque material is provided with two picture series on its two sides. The motion pictures are either displayed or projected by intermittent illumination upon passage of a picture of the ribbon through a display or projection window or frame which may be formed by a discharge tube bent into the shape of a helix or of a frame. In the arrangement as described in the earlier patents the pictures passing the display or projection window or frame are illuminated for a short period in the moment when the pictures pass through the display or projection window frame by the discharge tube. Illumination, as described in the said earlier patents, is produced by means of current pulsations passing through the illuminating lamps in the form of discharge tubes and operating them at predetermined intervals. These current impulses are synchronized with the passage of the pictures through the display or projection window and this synchronization is produced by means of a pair of contacts 32, 33 coming into operative engagement once for each picture. The contacts are therefore arranged on both sides of the film, ribbon or strip and they can engage each other whenever a cut or hole in the ribbon 30 permits such interengagement.

Discharge tubes of the mercury type are preferably used as illuminating lamps for the pictures. However lamps of this type require a relatively high voltage. They also have the drawback of furnishing light the intensity of which is concentrated in a definite section of the spectrum. As pictures viewed in reflected light are most effective when viewed in colors and preferably in so called natural colors, the production of light which is predominantly of the short wave type is undesirable as it affects the color of the picture. Therefore according to the invention illumination is preferably produced by two discharge tubes, one lamp being of the mercury pool discharge tube type, producing predominantly light belonging to the short wave end of the spectrum while the other lamp is of the neon discharge tube type producing predominantly light belonging to the long wave end of the spectrum.

This balanced illumination requiring a plurality of discharge tubes is however not easily obtainable in the described arrangement on account of the high light intensity to be produced with a given pulsation rate. Special means have therefore to be used to obtain the high voltages and current intensities for the lamps.

According to the invention therefore the power pack 10, converting the A. C. furnished by any network 11, 12 into direct current by means of rectifiers, and which need not be described as it is a standard unit, is connected to a transformer 15 having a primary winding 16 with a relatively small number of turns and a secondary winding 18 with a large number of windings which may also be used as an auto-transformer and which is therefore provided with means for tapping it at a desired point 20. This point is connected by means of conductor 21 with the positive conductor 22 carrying the highest positive voltage furnished by the power pack.

One end 26 of the combined auto-transformer and secondary coil 18 is connected with the current pulsation or storage producing device 75 which is identical with the device already described in the earlier Patents Nos. 2,173,768 and 2,262,051 and is also provided with the reference numerals used in the specification of these earlier patents. It consists of an electronic tube 68 of the triode type provided with a cathode 70, a grid 71 and a plate 69. The plate 69 is connected with the plate circuit 28 which is joined to point 26 of the coil 18 and is therefore also connected with the highest positive voltage at 22, by means of tapping point 20 and conductor 21.

The grid circuit 76 contains the resistance 74, the purpose of which has been explained in the above mentioned earlier patents and is connected with contact 34 resting on one side of the band or ribbon 30 ready for contact with plate or button contact 33 on the other side of the band or ribbon 30 whenever a cut portion or hole 64 in the band or ribbon is drawn past the two contacts.

The second contact 33 is connected by means of circuit 77 with the negative conductor 24 of the power pack and the cathode 70. The grid circuit also comprises the biasing branch 78 containing a resistance 72 and the biasing battery 73 turning its negative side towards the grid and making it more negative than the cathode.

The biasing battery and the resistance 72 are so selected that the negative grid bias cuts off the flow of electrons through the tube under those conditions, which prevails when the biasing branch circuit 78 is the sole branch circuit acting on the tube. However as has been explained in the earlier patents above referred to, whenever the contacts 33, 34 engage upon passage of a cut or hole 64 in the band or ribbon 30 the negative bias is removed to a degree controlled by resistance 74, the tube becomes conductive and a current pulsation is set up upon the passage of the plate current from conductor 22 over plate circuit 28 and that portion of coil 18 which is contained in this circuit.

The mercury arc discharge lamp 40 is connected with the negative conductor 24 (usually grounded as shown at 23) on one side and with the end 29 of auto-transformer and secondary coil 18 of transformer 15 by means of conductors 38 and 42. It is preferable to include a resistance 46 into the branch 42 leading to the mercury lamp 40 which may be bridged by a suitable condenser 48. The same branch 38 may also be connected with the neon tube 50 by means of conductor 44, while the second electrode of the discharge tube 50 is connected with the point 26 of the auto-transformer 15, by means of a branch conductor 28a.

As seen from Figure 2 the two tubes 40 and 50 are both encircling the picture frame and are in the form of a helix or of a frame. In fact each tube may consist of a number of windings the pictures being small and thus permitting to use several windings with a given length of the discharge tube. However in the diagram shown in Figure 1 the tubes are shown at different places and as mere frames for the sake of greater clearness.

The two discharge tubes 40 and 50 are connected in parallel and would therefore be energized merely at each other's expense from a given common source of current. Practically this would mean that merely the mercury lamp would operate. In order to avoid the use of special high powered sources of current, the specific way in which the mercury tube operates is made use of in order to provide both discharge tubes from the same customary source of power with voltages and current intensities suitable for operation and intensive illumination.

A diode tube 60 which may have a heated cathode (not shown) is used for this purpose which is connected with the primary coil 16 of the transformer 15 by means of conductor 62 on one hand and with the positive side of the mercury tube by means of conductor 63 on the other hand. This tube in connection with the fact that the mercury tube changes its resistance after the arc has been formed, provides a second source of supply which not only short circuits the resistance 46 but also acts as a voltage booster, counteracting and over-compensating the voltage drop developing with the lowering of the resistance in the mercury tube. It therefore produces a discharge in the neon tube and a discharge under high voltage in the mercury tube thus producing an intensive momentary illumination. The illumination is therefore not only improved with respect to its spectral qualities but also with respect to its intensity.

The operation which has already been partly described is the following.

When the contacts 33, 34 (or 66, 67 of Patent No. 2,173,768) engage a current surge or sudden current pulsation is produced in the circuit 22—21—20—26—28—69—70—77—24, as already described. This current impulse includes the windings of the coil 18 which are contained between points 20 and 26. As coil 18 contains a large number of windings a current of high voltage is induced between joints 26 and 29 the coil acting as auto-transformer. This current is applied to the two discharge tubes arranged in parallel, the circuit for tube 40 including the resistance 46. The discharge through the mercury filled tube 40 immediately causes a lowering of the resistance in the circuit as the mercury evaporates and a mercury arc is formed. A heavy current therefore starts to flow in the circuit 62, 63 passing from 24 to 22 through the diode 69. This current also passes primary coil 16 and the pulsation due to this current will induce a further high voltage current in coil 18. The voltage adds itself to the voltage already produced which is thus boosted to a high value. The neon lamp therefore lights up under the high voltage which also produces a more intensive illumination in the mercury discharge tube.

As the time required for the lowering of the resistance of the mercury tube is very short when compared with the time required for the change of a picture, the two lamps light up practically simultaneously for each picture and thus produce the desired momentary illumination intended to produce a motion picture, which is controlled and governed by the electronic tube 68.

The brightness of the illumination is, of course, a direct function of the electrical output of the power pack.

It will be seen from the above that an illumination improved in quantity and quality is provided with relatively very simple means.

It will be understood that those details of the arrangement used which have not been described are to be found in the earlier patents above mentioned.

It will also be understood that changes in the construction of unessential details do not affect the invention as expressed in the annexed claims.

Having described the invention, what is claimed as new is:

1. A motion picture or viewing apparatus with a plurality of electric discharge tubes producing differently colored discharges and operating simultaneously for the short timed illumination of rapidly moving picture frames, comprising a mercury arc discharge tube and a neon filled discharge tube, operative supply circuits for the same means for continuously producing successive practically simultaneous short timed discharges in all the discharge tubes, said means including means for producing short timed high voltage impulses in the supply circuits, and voltage boosting means connected with the supply circuit of the mercury arc discharge tube and operated by the current surge occurring upon the initiation of an arc discharge in the mercury tube for raising the voltage of the high voltage impulses produced by the high voltage producing means which were lowered by the initiation of an arc discharge in the mercury tube to the striking voltage of the neon filled tube.

2. A motion picture or viewing apparatus with a plurality of electric discharge tubes, including a mercury and a neon filled gas discharge tube, producing short timed differently colored illuminating discharges at intervals for the illumination of rapidly moving picture frames, comprising means for producing low voltage impulses, synchronized with the passage of the picture frames, an auto transformer coil with windings supplied with said low voltage impulses, and with further windings generating high voltage current impulses, supply circuit branches for said discharge tubes connected with said high voltage generating winding for supplying the mercury filled tube and the neon filled gas discharge tube simultaneously with current, a further winding on said auto transformer in operative relationship to said transformer coil generating high voltage currents for action as a primary winding, a circuit branching off from the mercury filled tube supply branch and connected with said primary winding on said auto transformer, and means for producing a current surge in said primary winding upon the initiation of a discharge in the mercury filled tube, said current surge producing the boosting of the voltage in the supply circuit of the neon filled discharge tube.

3. A motion picture or viewing apparatus with a plurality of electric discharge tubes, including a mercury and a neon filled discharge tube, producing short timed differently colored discharges at intervals for the illumination of rapidly moving picture frames, comprising means for producing low voltage impulses synchronized with the passage of the picture frames, a transformer having an auto-transformer coil with windings supplied with said low voltage circuit impulses, and with further windings generating a high voltage current, supply circuit branches for said discharge tubes both connected with said high voltage generating windings for supplying the mercury filled tube and the neon filled gas discharge tube simultaneously with current, a resistance in said mercury filled discharge tube supply circuit, a further winding on said transformer acting as a primary winding for the auto transformer coil, a circuit branching off from the mercury filled tube supply branch between the aforesaid tube and the resistance in the supply circuit, said circuit being connected with said further winding of the auto transformer, and a rectifying means in the aforesaid circuit connected with the said further winding of the auto transformer for producing a unidirectional current surge upon the initiation of a discharge of the mercury filled tube, boosting the voltage of the supply circuit of the neon filled discharge tube.

GEORGE SABOL, Jr.
MICHAEL SABOL.

REFERENCES CITED

The following references are of record in the file of this patent:

UNITED STATES PATENTS

| Number | Name | Date |
| --- | --- | --- |
| 900,733 | Hewitt | Oct. 13, 1908 |
| 1,079,343 | Hewitt | Nov. 25, 1913 |
| 1,231,494 | Claude | June 26, 1917 |
| 1,787,333 | Abel | Dec. 30, 1930 |
| 1,911,584 | Robertson | May 30, 1933 |
| 1,957,404 | Beck | May 1, 1934 |
| 1,983,402 | Rodman | Dec. 4, 1934 |
| 2,012,236 | Beck | Aug. 20, 1935 |
| 2,148,007 | Batchelor | Feb. 21, 1939 |
| 2,262,051 | Sabol et al. | Nov. 11, 1941 |
| 2,358,810 | Karash | Sept. 26, 1944 |